United States Patent
Gagne et al.

(12)

(10) Patent No.: US 6,389,768 B1
(45) Date of Patent: May 21, 2002

(54) MOLDED PLASTIC DOOR SKIN

(75) Inventors: Robert J. Gagne, Glastonbury, CT (US); Robert J. McBean, Acton (CA); John D. Gephart, Rocky Hill, CT (US)

(73) Assignee: The Stanley Works, New Britain, CT (US)

( * ) Notice: Subject to any disclaimer, the term of this patent is extended or adjusted under 35 U.S.C. 154(b) by 0 days.

(21) Appl. No.: 09/361,528

(22) Filed: Jul. 27, 1999

(51) Int. Cl.[7] .................................................. E04B 3/70
(52) U.S. Cl. ........................ 52/309.9; 52/307.11; 52/455
(58) Field of Search ........................... 52/309.9, 309.11, 52/455, 456

(56) References Cited

U.S. PATENT DOCUMENTS

| | | | |
|---|---|---|---|
| 3,750,337 A |   | 8/1973 | Brydolf et al. |
| 4,311,183 A | * | 1/1982 | Herbst et al. .................. 52/455 |
| 4,635,421 A | * | 1/1987 | Newberg ...................... 52/455 |
| 4,860,512 A | * | 8/1989 | Thorn .......................... 52/455 |
| 4,901,493 A | * | 2/1990 | Thorn .......................... 52/455 |
| 5,016,414 A | * | 5/1991 | Wang .......................... 52/455 |
| 5,074,087 A | * | 12/1991 | Green ......................... 52/455 |
| 5,293,726 A | * | 3/1994 | Schick ........................ 52/455 |

FOREIGN PATENT DOCUMENTS

| | | |
|---|---|---|
| EP | 0 638 413 A1 | 2/1995 |
| GB | 2 133 069 A | 7/1984 |
| GB | 2 285 598 A | 7/1995 |
| WO | WO 95/13916 | 5/1995 |

\* cited by examiner

*Primary Examiner*—Richard Chilcot
(74) *Attorney, Agent, or Firm*—Pillsbury Winthrop LLP

(57) ABSTRACT

A door comprising a laminated panel having a peripheral frame defining the peripheral edge thereof. The laminated panel comprises an outer skin of thermoplastic material impregnated with opaque pigmentation and an inner substrate intimately bonded with the outer skin. The inner substrate is formed of a relatively rigid thermoplastic material impregnated with a filler. The outer skin defines a three dimensional door surface which presents the texture and at least a part of the color of the exterior appearance of the door in use. A method of making the door includes the steps of coextruding the molten material of the outer skin and the molten material of the inner substrate to obtain an intimately bonded laminated continuous sheet, cutting the continuous sheet into blanks, heating a blank to cover the surface of a vacuum forming die having a die surface defining a three dimensional exterior configuration of one surface of the panel and vacuum forming the laminated sheet at a temperature rendering the substrate pliable and near liquid with the outer skin in engagement with the die surface to form a relatively rigid door panel when cooled. After trimming the vacuum formed panel, a door can be formed from the panel by applying the metal trim frame to the periphery of the panel. The laminated panel and peripheral frame can be used as a closet door or the like. A two sided door can be formed by mounting two spaced panels on a peripheral frame and injecting a foamed plastic material impregnated with a filler in the space defined by the panels and the peripheral frame.

29 Claims, 13 Drawing Sheets

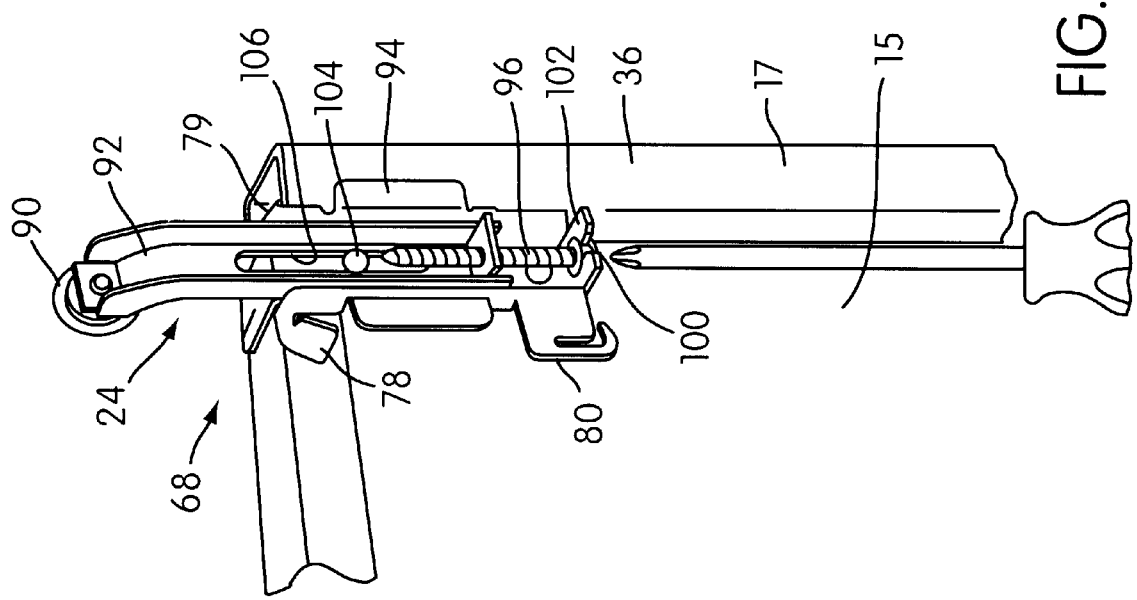
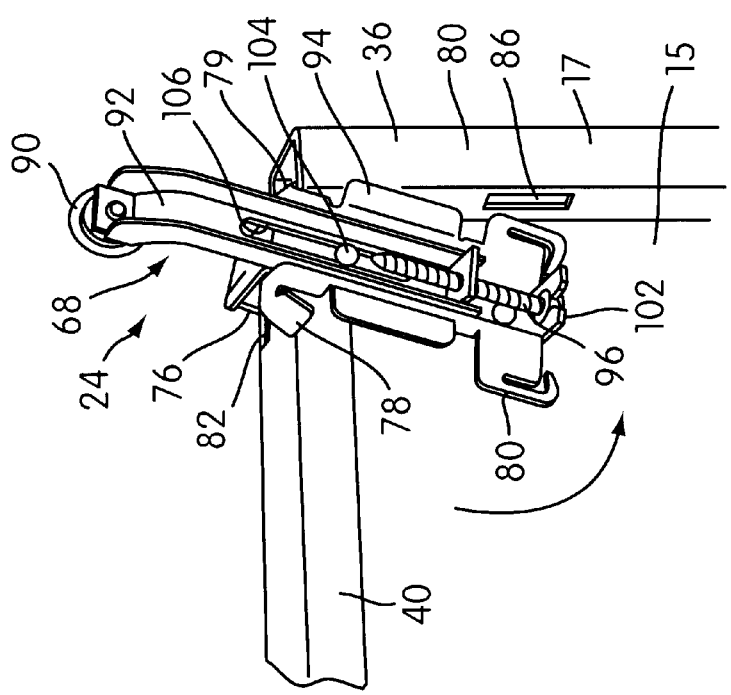

MOLDED PLASTIC DOOR SKIN

FIELD OF THE INVENTION

The present invention relates to doors and more particularly to a co-extruded, vacuum molded plastic panel mounted in a peripheral frame to provide a lightweight, durable, low-cost and aesthetically pleasing door.

BACKGROUND OF THE INVENTION

Sliding, folding and hinged doors are commonly found in the interiors of most homes. Sliding and folding doors are frequently used as doors for closets and hinged doors are commonly used as doors for rooms. Traditionally, many doors were made entirely of wood, but in recent years, doors made from alternative materials have been produced that are less expensive and easier to transport and install than doors made entirely of wood. These materials include molded wood pulp or fibers that are pressed in molds to form a thin molded panel structure which has the shape of a traditional looking door, such as a traditional raised six-panel door. The thin molded panels are glued to a frame which provides structural support. A typical frame for a thin molded panel is made of roll-formed sheet steel shaped to be mounted around the peripheral edges of the panel. The frame mounted panels are then finished so that the resulting product looks very much like a traditional wooden six panel door.

When attempts were made to use these thin molded panels individually as sliding doors, a major problem with this door construction was discovered. When one thin panel is framed with the roll-formed steel frame, for example, the panel is susceptible to warping and contortion because the wood components in the panel are hydroscopic and so tend to absorb moisture. This moisture absorption occurs regardless of how well wood fiber panels are sealed with paint or other surface treatments.

This general approach to door construction offers many advantages, however, because a door comprised of a thin panel mounted in a rigid metal frame can provide a lightweight, low-cost and aesthetically pleasing door if the problems associated with prior art thin door panels can be overcome. Thus, there is a need for a lightweight, durable, aesthetically appealing and economical panel that resists warping when mounted in a frame to provide a door.

SUMMARY OF THE INVENTION

To meet the need identified above, the present invention provides a door comprising a laminated panel having a peripheral frame defining the peripheral edge thereof. The laminated panel has an outer skin of thermoplastic material impregnated with opaque pigmentation and an inner substrate of a relatively rigid thermoplastic material impregnated with a filler and intimately bonded with the outer skin. The laminated panel is formed so that the substrate defines a door surface that faces interiorly in use, as toward the inside of a closet, and the outer skin defines a three dimensional door surface that presents the texture and at least a part of the color of the exterior appearance of the door in use.

A method of making a door having such a frame-mounted two layer plastic panel is also provided. A method for making the door comprises the steps of (1) coextruding an outer skin of plastic material defining an opaque color and an inner substrate of normally rigid plastic material capable of being rendered into a soft pliable condition by the application of heat to obtain an intimately bonded laminated sheet, (2) heating a sufficient area of the intimately bonded laminated sheet to cover the surface of a vacuum forming die having a die surface defining a three dimensional exterior configuration of one surface of a door, and (3) vacuum forming the laminate at a temperature rendering the substrate pliable with the outer skin in engagement with the die surfaces to form a relatively rigid door panel when cooled in which the substrate defines a door surface which faces interiorly in use and the outer skin defines a three dimensional surface which presents the texture and at least a part of the color of the exterior appearance of the door in use.

Other objects, features, and advantages of the present invention will become apparent from the following detailed description, the accompanying drawings, and the appended claims.

BRIEF DESCRIPTION OF THE DRAWINGS

FIG. 7 shows a portion of the laminated panel, a portion of a rail and a stile of the door frame and a corner connector assembly positioned to be mounted to the rail and stile;

FIG. 8 is a few similar to FIG. 7 but showing the corner connector assembly in a fully mounted condition;

DETAILED DESCRIPTION OF THE INVENTION

Figure 1:
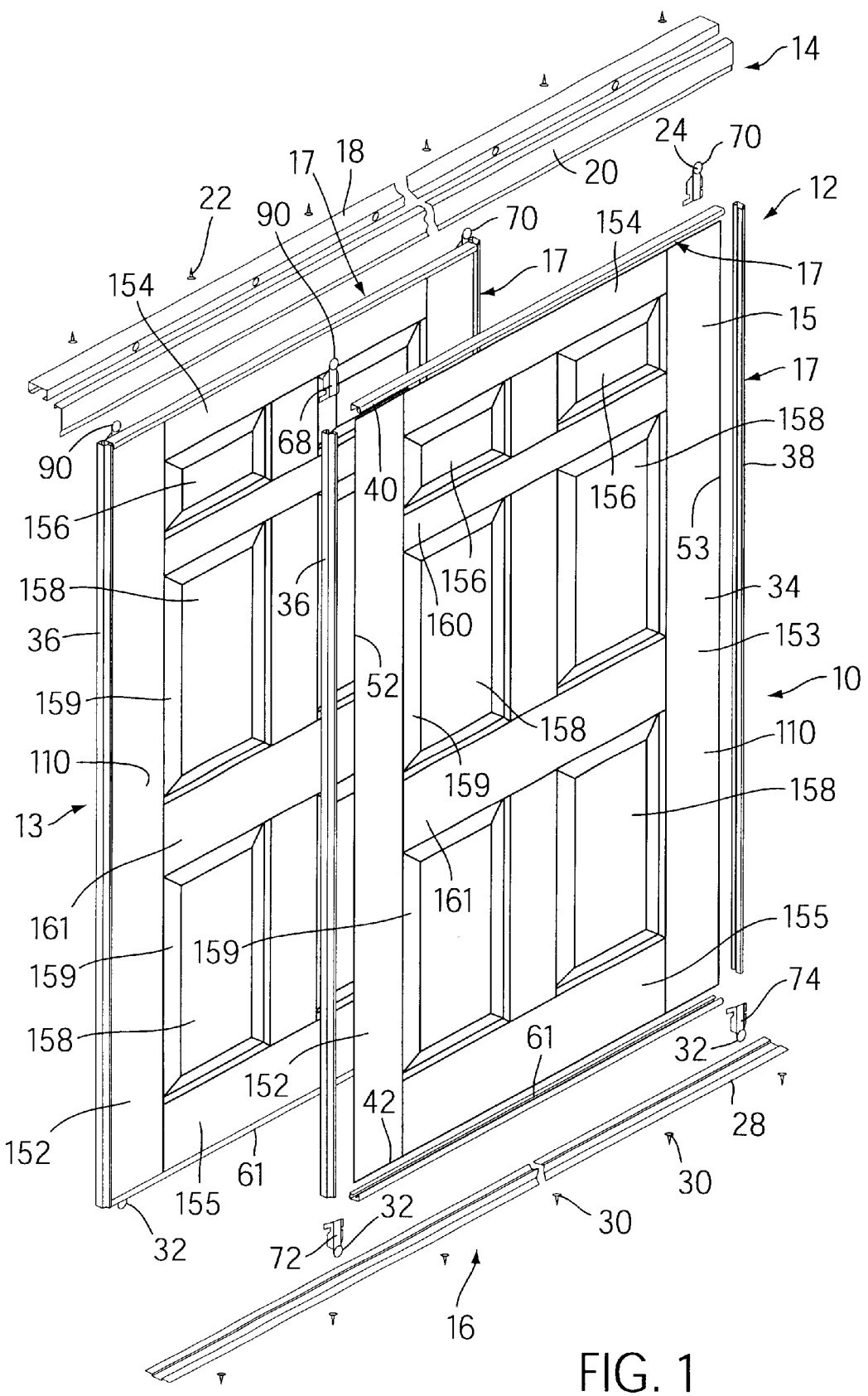
FIG. 1 shows a partially exploded view of a bypassing pair of doors constructed according to the principles of the present invention of a door assembly.

FIGS. 1–9 show a door assembly, generally designated 10, constructed according to the principles of the present invention. The door assembly 10 generally includes a pair of doors 12, 13 and upper and lower door mounting assemblies 14 and 16, respectively, for mounting the doors 12, 13 for independent movement with respect to a frame of a doorway (not shown) between open and closed positions. The doors 12, 13 are normally used in bypassing pairs, but it is contemplated to use a single door or more than two doors to span a single doorway. Because the doors 12, 13 are identical, only door 12 will be discussed below. The door 12 includes a laminated panel 15 and a peripheral frame 17 formed of a trim preferably made of metal that defines the peripheral edge of the door 12.

The upper door mounting assembly 14 includes an upper track structure 18 that is mounted generally horizontally to the door frame above the doorway and/or to a wall adjacent the doorway by the track structure 18 using threaded fasteners such as wood screws 22. An accessory fascia 20 is used to conceal the hardware above the door 12. A pair of upper rollers 24 that are mounted (in a manner described below) on a frame 17 of the door 12 rollingly engage the track structure 18 to rollingly support or "hang" the door 12 on the upper door mounting assembly 14 for movement between open and closed positions to uncover or cover the doorway.

The lower door mounting assembly 16 includes a lower track structure 28 that is mounted to the floor (not shown) underneath the upper track structure 18 using conventional fasteners such as wood screws 30. A pair of lower guides 32 that are mounted (in a manner described below) on the frame 17 of the door slidably engage in the lower track structure 28. The lower track structure 28 and lower guides 32 cooperate to guide the movement of the door 12 between open and closed positions and to help maintain the upper rollers 24 in engagement with the upper track structure 18.

Figure 2:
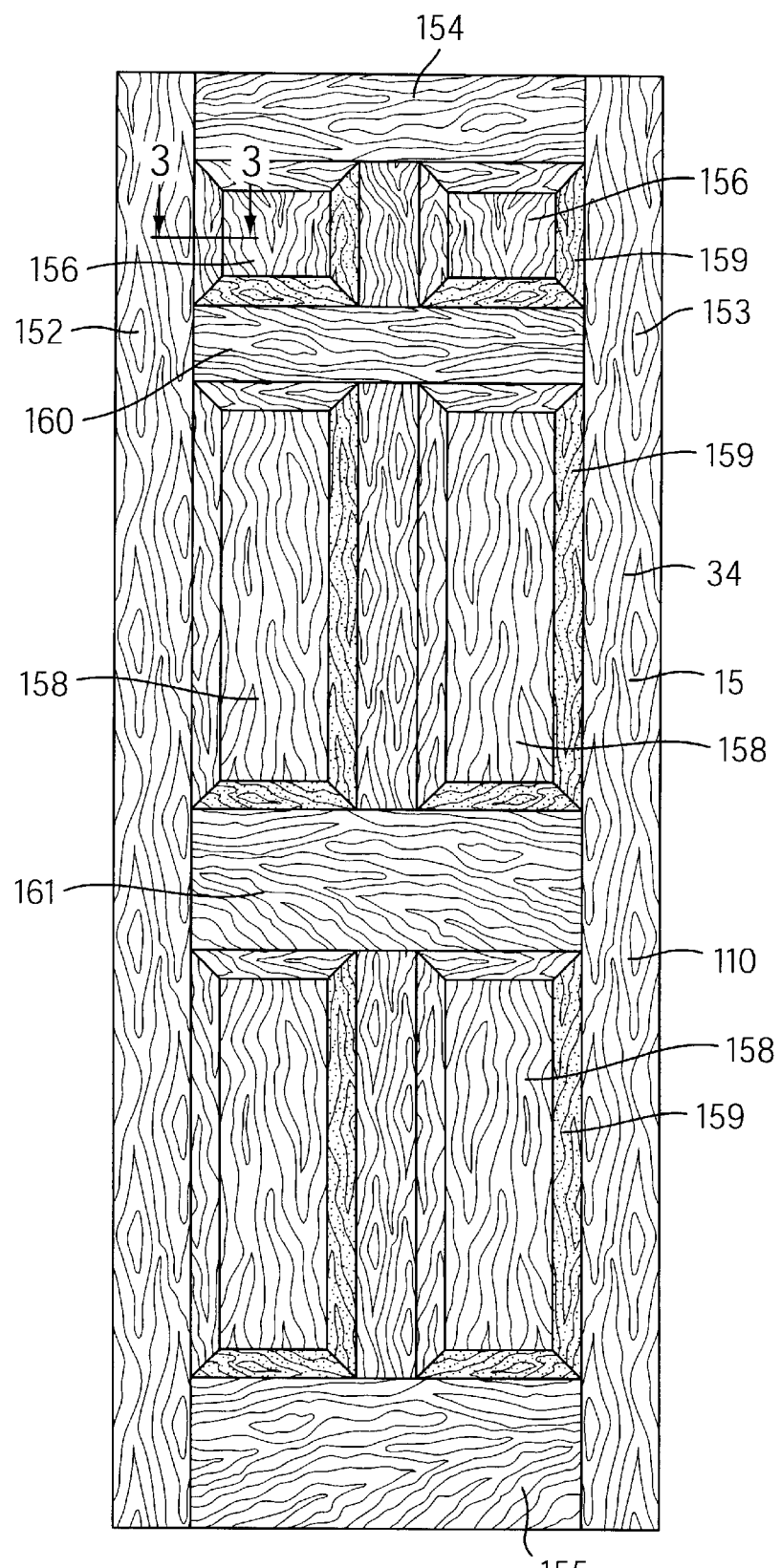
FIG. 2 shows a front elevational view of a laminated door panel of the door assembly.
Figure 3:
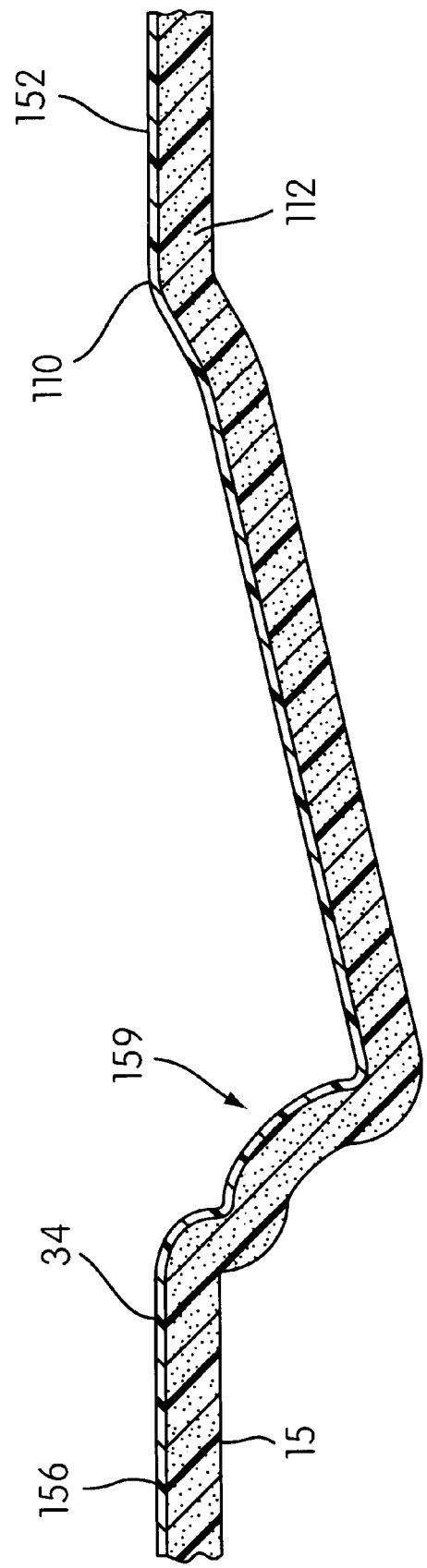
FIG. 3 shows a cross sectional view of a fragment of the laminated panel taken through the lines 3—3 of FIG. 2.

The structure of the door 12 and the manner in which the frame 17 and the rollers 24 and guides 32 are mounted on the panel 15 of the door 12 can be understood with particular reference to FIGS. 2–8. FIG. 2 shows an elevational view of an exteriorly facing side 34 (where exteriorly is considered from the point of view of a person standing, for example, outside of a closet or room and the door 12 is closing off a doorway to the closet or room) of the panel 15 of the door 12 in isolation and FIG. 3 shows cross-sectional view of a fragment of the laminated panel 15. FIGS. 4–8 show the structural details of the door frame 17 and the manner in which the frame and rollers 24 and guides 32 are mounted to the panel 15.

The primary focus of the present invention is the structure of the laminated panel 15 and a method for making the same. The construction of the frame 17, the manner in which the frame is mounted around the periphery of the panel 15, the manner in which the rollers 24 and guides 32 are mounted to the frame 17 and the manner in which the assembled door 12 is mounted in a doorway for movement between open and closed positions is of secondary importance and may be by any means known to one skilled in the art. It is therefore within the scope of present invention to provide a frame of any known construction that can be used to support a thin panel in a doorway and to use frame mounting hardware of any known construction to mount the frame to panel 15 in a doorway for movement as an aforesaid.

The construction of the frame 17, the manner in which the frame 17 is mounted to the panel 15 and the manner in which the framed panel 15 is mounted in a doorway will be briefly considered first and then the structure of the panel 15 and a preferred method for making the same will be considered.

Figure 4:
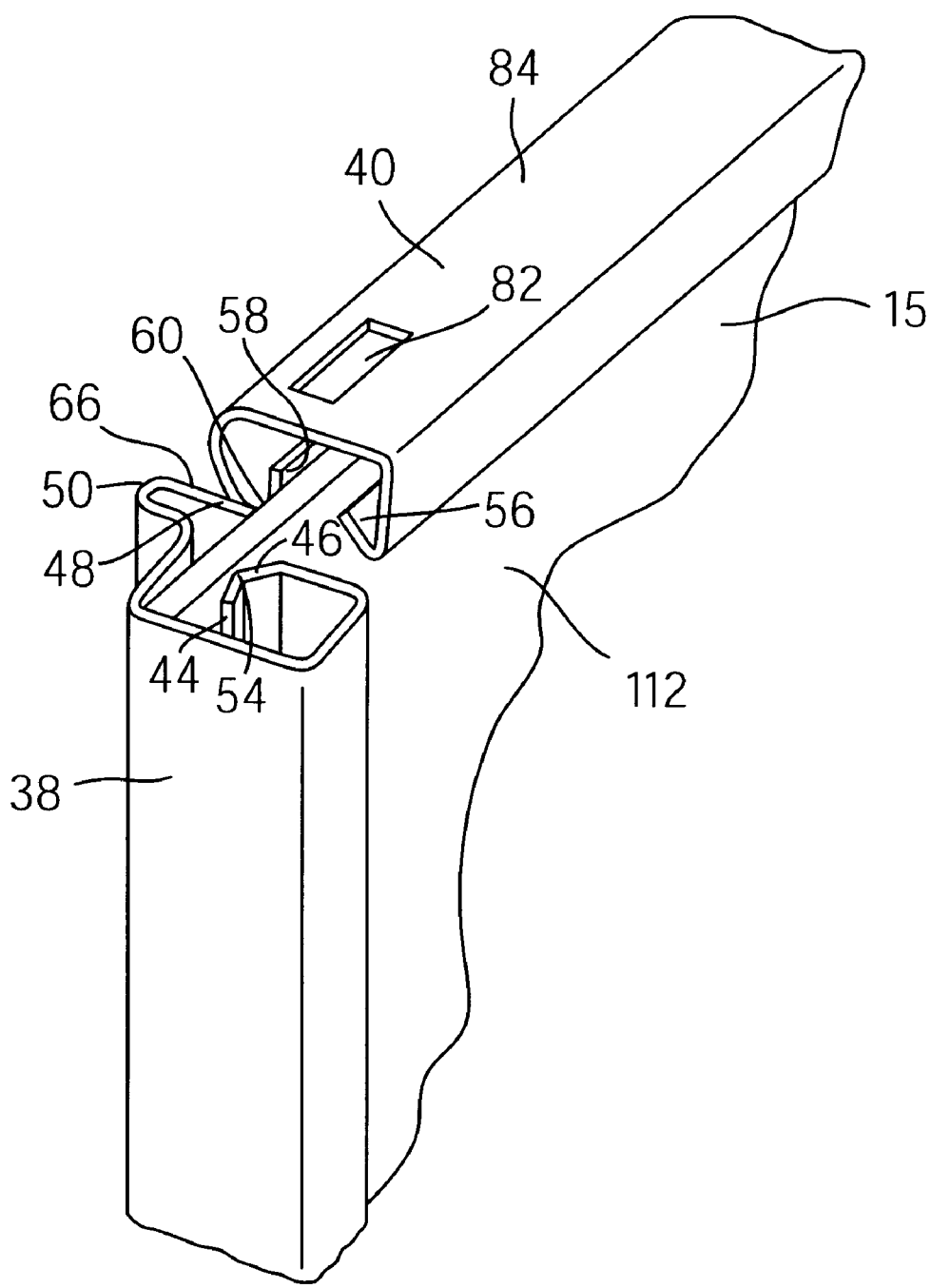
FIG. 4 is a perspective view of a portion of the laminated door panel showing a stile on and a rail partially on edges of the panel.
Figure 5:
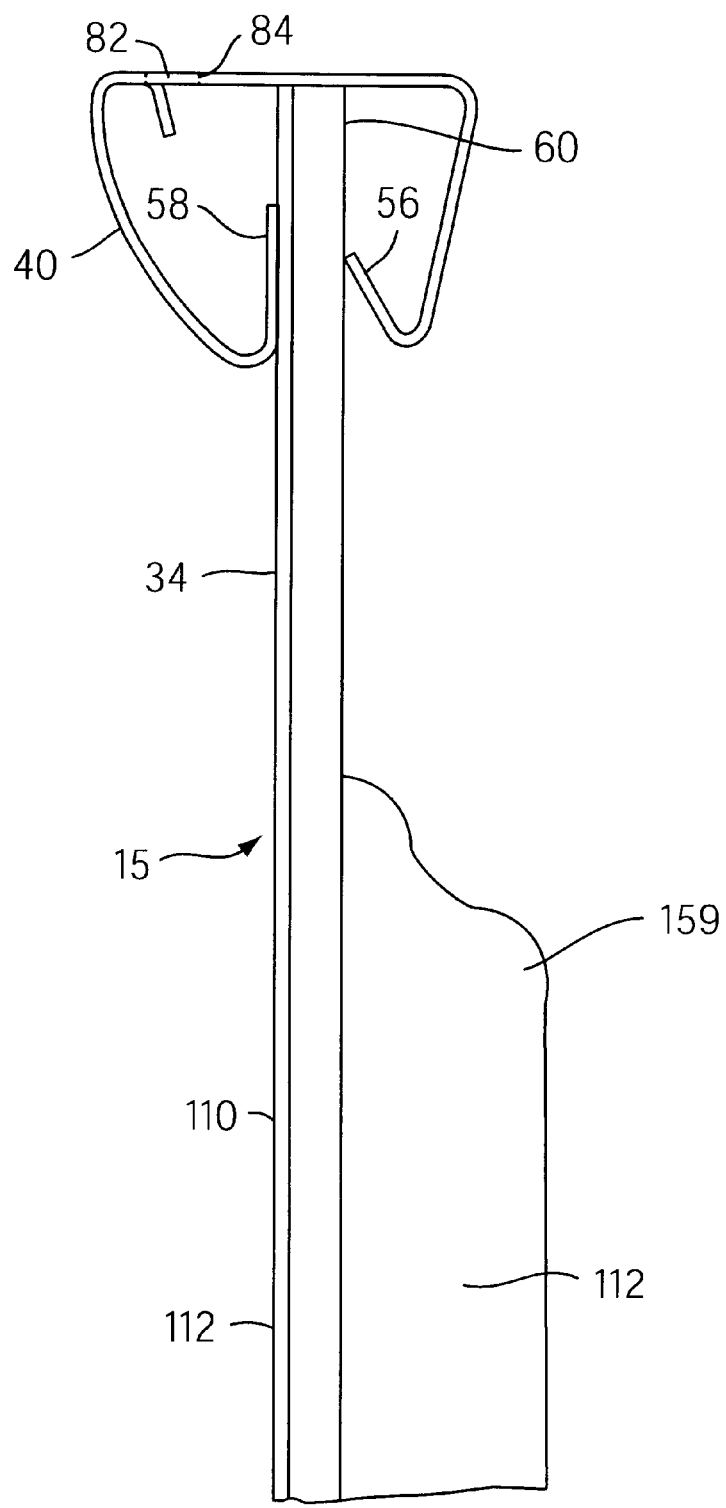
FIG. 5 is an end view of a rail of the door frame showing a fragmentary portion of the panel mounted therein.

The door frame 17 includes a pair of vertically extending stiles 36, 38 (see FIGS. 1, 4, 6, for example) and a pair of horizontally extending rails 40, 42 (see FIGS. 1, 4–5, for example). The stiles 36, 38 are of identical construction and are given different reference numbers only to facilitate discussion of the invention. Similarly, the rails 40, 42 are of identical construction and are given different reference numerals for a similar reason.

Figure 6:
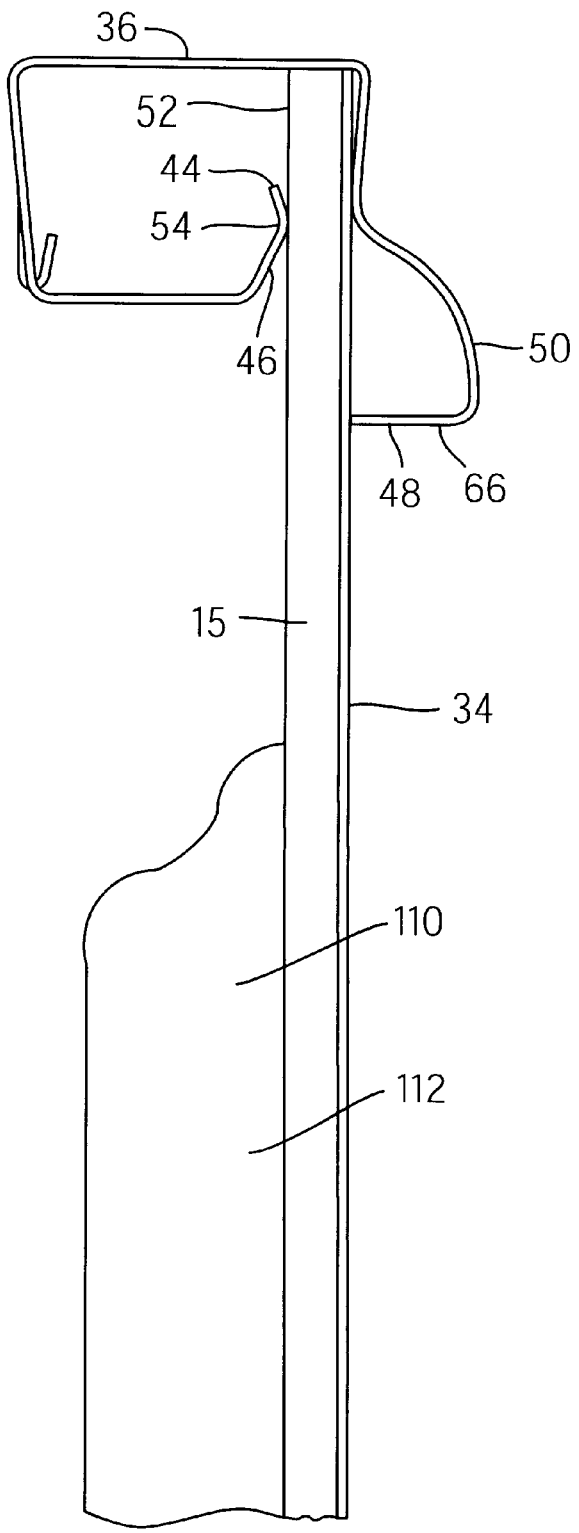
FIG. 6 is an end view of a stile of the door frame showing a fragmentary portion of the panel mounted therein.

Preferably the stiles 36, 38 and rails 40, 42 are elongated rigid structures constructed of sheet steel that has been roll-formed or shaped by any other appropriate method (such as extrusion, for example) to have a generally C-shaped cross section (as can be understood from the end views of FIGS. 5–6). One longitudinally extending edge 44 of the stile 36 is angled inwardly to provide the cross-section with an inner "leg" 46 and an opposite longitudinally extending edge 48 is shaped to provide the cross section with a hook-shaped leg portion 50. Each stile 36, 38 is mounted on a longitudinally extending vertical edge 52, 53, respectively, of the panel 15 with the edge 52 pinched between a knee portion 54 of the inner leg 46 and the outer leg 50 (FIG. 6).

The rails 40, 42 are also roll-formed to have a generally C-shaped cross section (as can be appreciated from the and view of rail 40 in FIG. 5) that terminates in an inner leg 56 and an outer leg 58. Each rail 40, 42 is mounted on an upper or lower transversely extending horizontal edge 60, 61, respectively, of the panel 15 with the respective edge pinched between the inner leg 56 and outer leg 58 (FIG. 5).

As can be appreciated from FIGS. 4, 7–8, each stiles 36, 38 extends the entire length of the respective vertical edge 52, 53 so that each end of each stile is flush with the associated horizontally extending edge 60, 61 of the panel 15; and each rail 40, 42 is constructed to have a length that is slightly shorter than the length of the horizontal edge 60, 61 on which it is mounted but long enough so that each end of each rail 40, 42 abuts an outer wall portion 66 on each stile 36, 38. The stile is fully installed on the panel 15 in FIG. 4 but the rail is only partially installed on the panel 15 to more fully show the invention.

Four corner connector assemblies 68, 70, 72, 74 are provided on the four comers of the frame 17 to hold the same securely together and to provide the upper rollers 24 and lower guides 32. Corner connector assemblies 68 and 70 are identical and corner connector assemblies 72 and 74 are identical. They are structurally unhanded so that either assembly 68, 70 can be mounted in either upper corner of the frame 17 and either assembly 72, 74 can be mounted in either lower corner of the frame 17; the assemblies 68, 70 and assemblies 72, 74 are given different reference numbers to facilitate the description of the invention.

The construction of the assemblies 68, 70, 72, 74, the manner in which they are mounted to the stiles and rails of the door frame and the manner in which the assemblies are used to mount a door in a doorway are described in U.S. Pat. No. 3,750,337, which patent is hereby incorporated by reference into the present application in its entirety and this description will not be repeated in detail in the present application. The assemblies 68, 70, 72, 74 and the manner in which the same are mounted to the frame 17 can be appreciated from FIGS. 7–8. Each assembly 68, 70, 72, 74 is a metal structure that has an outer flange portion 76, two lateral flange portions 78,79 and the spring tab 80. FIGS. 7–8 illustrate the installation of one assembly 68 at one corner of the frame 17; it can be appreciated that the other three assemblies 70, 72, 74 are installed in a similar manner because the mounting or base portions 94 of all four assemblies 68, 70, 72, 74 are identical.

To install the assembly 68 on a corner of the frame 17, a lateral flange portion 79 of the assembly is inserted in a free end of the associated stile 36 and the outer flange portion 76 of the assembly 68 is inserted in an opening 82 struck in an upper wall portion 84 of the associated rail 40. The assembly 68 is then rotated with respect to the frame 17 in a direction shown by a directional arrow in FIG. 7 causing the spring tab 80 to enter an opening 86 struck in the stile. The spring tab 80 is constructed and arranged to snap-lock in the opening 86 to hold the assembly 68 on the frame 17. It can be understood that the flange portions 76, 78, 79 and the spring tab 80 cooperate to hold frame together.

It can be appreciated from FIGS. 7–8 that an upper roller 24 is provided on the assemblies 68 and that the roller 24 includes a wheel 90 rotatably mounted on a bracket 92. The bracket 92 is movably mounted on a base portion 94 of the connector assembly 68 so that the vertical distance between the top of the associated rail and the wheel 90 can be adjusted. More specifically, the bracket 92 is slidably engaged with the base portion 94 and a threaded fastener 96 is provided between the base portion 94 and the bracket 92 such that rotation of the fastener 96 causes movement of the bracket 92 with respect to the base portion 94.

A head portion 100 of the threaded fastener 96 is rotatably mounted in a V-shaped structure 102 on the base portion 94, but is prevented by the V-shaped structure 102 from moving in a vertical direction so that rotation of threaded member 96 moves the bracket 92 and wheel 90 vertically with respect to the associated rail; and the threaded faster 96 holds the bracket 92 and wheel 90 in the adjusted position when the door is in normal use. A shoulder rivet 104 secured to the base portion 94 extends through an elongated vertical slot 106 in the bracket 92 to guide to the sliding vertical movement of the bracket with respect to the base portion 94. Preferably the free end of the shoulder rivet 104 is swedged to help prevent the bracket 92 from being separated from the base portion 94.

The bracket 92 is movably mounted to the base portion 94 so that after installation, the vertical position of the wheel 90 with respect to the associated rail can be easily adjusted to plumb the door 12 to the door jamb of the doorway in which the door 12 is being installed. The threaded fastener 96 is self-locking in any position of vertical adjustment. Thus, it can be appreciated that when the frame 17 is assembled, it defines a peripheral edge along the laminated panel 15 and that each wheel 90 is vertically spaced from the associated rail so that each wheel rolling engages the associated door mounting assembly 14 or 16 to rollingly mount the door 12 in the doorframe of the doorway.

The structure of the laminated panel 15 is best understood from FIGS. 2–3. As shown in the cross section of FIG. 3, the laminated panel 15 has an outer skin 110 of thermoplastic material that is intimately bonded to an inner substrate 112 of a relatively rigid thermoplastic material. As will be explained in detail below, the outer skin 110 is impregnated with opaque pigmentation so that the outer skin 110 of plastic material presents an opaque color on an exterior surface of the door 12. The laminated panel 15 is formed so that the substrate layer 112 defines a door surface that is faces interiorly (where "interiorly" means that when the door 12 is mounted in a doorway, such as a closet doorway, the substrate 112 faces into the interior of the closet) when the door 12 is in use and the outer skin 110 defines a three-dimensional door surface 34 that presents the texture and at least a part of the color of the exterior appearance of the door 12 in use. Thus, when the door 12 is mounted, only the outer skin 110 side of the door is normally visible.

The structural details of the door panel 15 can best be understood after a preferred method for making the panel 15 is considered. Generally, the panel 15 is made by (1) co-extruding two layers of plastic material to form a sheet or blank of material, (2) vacuum forming the sheet of material to provide the sheet of material with contours or relief features that resemble a door such as a raised six panel door and to optionally provide the exterior surface of the door with a texture or pattern such as a wood grain pattern and then (3) cutting the sheet of material to dimensions appropriate for a door panel.

More specifically, a preferred method of making the door panel includes the steps of (1) coextruding the outer skin 110 of plastic material defining an opaque color and the inner substrate 112 of normally rigid plastic material capable of being rendered into a pliable, near liquid condition by the application of heat to obtain an intimately bonded laminated sheet or blank, (2) heating a sufficient area of the intimately bonded laminated sheet to cover the surface of a vacuum forming die having a die surface defining a three dimensional exterior configuration of one surface of a door 12 and (3) vacuum forming the laminate at a temperature rendering the substrate 112 pliable and near liquid with the outer skin 110 in engagement with the die surface to form a relatively rigid door panel 15 when cooled in which the substrate 112 defines a door surface that faces interiorly in use and the outer skin 110 defines a three dimensional surface that presents the texture and at least a part of the color of the exterior appearance of one side of the door 12 in use. The edges of the panel may optionally be trimmed or smoothed by abrading after the vacuum forming step. After a panel 15 is made by this method, a door 12 can be formed from the panel 15 by applying a metal trim frame, such as frame 17, to the periphery of the panel 15.

Figure 9:
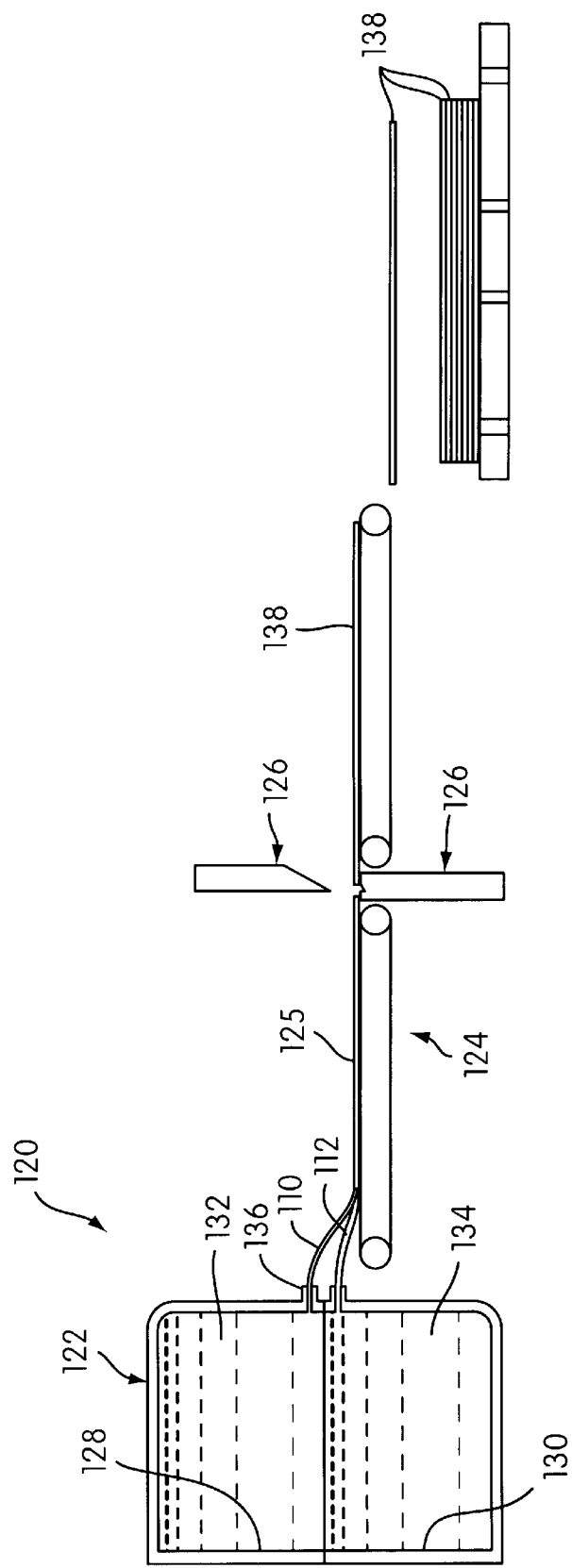
FIG. 9 is a schematic representation of a coextrusion apparatus for coextruding a continuous laminated sheet of material and for cutting the same into sheets or blanks of laminated material.

A coextrusion apparatus 120 for coextruding the continuous sheet material and for cutting the continuous sheet into a plurality of identical individual sheets or blanks is shown schematically in FIG. 9. The coextrusion apparatus 120 includes an extrusion box 122, a conveyor assembly 124 and the cutting apparatus 126. The extrusion box 122 includes two chambers 128, 130 that each contain molten plastic material 132, 134. A die assembly 136 is operatively associated with the extrusion box 122. The plastic material 132, 134 is extruded through the die assembly 136 to form, respectively, the two thin layers of thermoplastic material 110, 112 in intimately bond relation to provide a continuous sheet 125 of plastic material.

The conveyor assembly 124 is positioned to receive the continuous sheet 125 of the two layer laminated material and maintain the same in a flat condition while it cools and rigidifies. The conveyor assembly 124 advances the continuous sheet 125 into the cutting apparatus 126 which cuts the continuous sheet 125 into a series of flat, two-layer laminated panel blanks or sheets 138 of predetermined dimensions.

The width of the panels can be defined by the width of the openings in the die assembly 136 or, alternatively, the coextruded continuous sheet 125 can be extruded to be wider than the width of the panel blanks or sheets 138 and the cutting apparatus 126 can be used to trim off the lateral outer edges of the extruded continuous sheet 125 to define the width of the panel blank or sheet 138 by a cutting operation.

Each flat panel blank 138 is then placed in a vacuum mold, heated and shaped as aforesaid and as described in greater detail below. After the blank 138 is vacuum molded to form the panel, the panel may optionally be trimmed or shaped by cutting, abrading or the like to remove sharp portions from or otherwise shape the edges of the panel.

Before the vacuum molding process is discussed in detail, the construction of the panel will be considered in greater detail.

Preferably, the outer layer 110 has a thickness in the range of approximately 0.010 inch to approximately 0.020 inch and preferably the substrate 112 has a thickness in the range of approximately 0.105 inch to approximately 0.115 inch so that the total thickness of the panel 15 is approximately 0.125 inch. Alternatively, the substrate could be made slightly thinner so that the total thickness of the panel 15 is approximately 0.1 18 inch.

Preferably, the molten material 132, 134 in the two chambers 128, 130 is a polystyrene, the molten material 132 being impregnated with pigmentation so that the outer skin 110 comprises polystyrene impregnated with the pigmentation and the molten material 134 being impregnated with a filler so that the substrate 112 comprises polystyrene impregnated with a filler. (Alternatively, ABS can be provided in both chambers; PVC can be provided in both chambers; or any other appropriate moldable plastic material that can be coextruded and then vacuum formed can be used to construct the door panel. Preferably, any material used to construct the door panel should be resistant to. ultraviolet light degradation.) The molten polystyrene 132 (which forms the outer skin 110) is impregnated with pigmentation to give the outer skin 110 any desired color; in one preferred embodiment, for example, a white pigment is added to give the outer skin 110 a clean white appearance of painted wood. Preferably, the pigment is 5% (five percent) by volume of the material 132 used to form the outer skin 110.

The molten polystyrene 134 which forms the inner substrate 112 includes a mineral filler or fillers mixed into the molten polystyrene to improve the weight, lower the cost and increase the strength, rigidity and durability of the substrate 112. In one embodiment of the panel 15, for example, the preferred filler used in the substrate 112 is a very fine calcium hydroxide, although it is within the scope of the invention to use any suitable mineral as a filler.

It can be appreciated that while it is within the scope of the invention to form a panel 15 by extruding a pigmented and filled material (as opposed to co-extruding material) in a single layer to form the blanks 138 suitable for vacuum molding to form the panels 15, it is preferred to coextrude two layers to form the panels 15, even if the extruded materials are the same (i.e., they are both molten polystyrene in the example given above) because coextrusion is more economical. Specifically, the pigmentation material that is mixed in with the molten polystyrene material 132 in the chamber 128 is relatively expensive and so it is advantageous to color with pigmentation only the thin, exterior surface skin layer 110 of the panel 15 to save costs. It can be understood that because the pigmentation is preferably opaque, the substrate layer is not visible through the skin layer 110. Furthermore, it can be understood that because substrate layer 112 is not visible through the skin layer 110, the substrate 112 can be formed from re-ground polystyrene. Because the outer skin 110 is visible in normal use of the door, it is preferred to use pigment impregnated virgin polystyrene.

It can be understood that it is within the broad teachings of the invention to use any suitable plastic materials to form the outer skin 110 and substrate 112 that provide a rigid substrate 112 and an aesthetically pleasing outer skin 110 to form a panel that can be further shaped by vacuum molding. For example, a pigmented ASA acrylic can be used for the outer skin 110 and an ABS plastic with an appropriate mineral filler or fillers can be used to form the substrate 112. Although it is contemplated to use a wide range of types of fillers and a wide range of amounts of fillers as a percentage of the total volume of the substrate 112, preferably when a fine calcium hydroxide filler is used with polystyrene to form the substrate, the filler is provided in an amount that is within a range of approximately 20 percent to approximately 40 percent by volume of the substrate; more preferably, the calcium hydroxide filler is provided in an amount that is approximately 35 percent by volume of the substrate.

Figure 10:
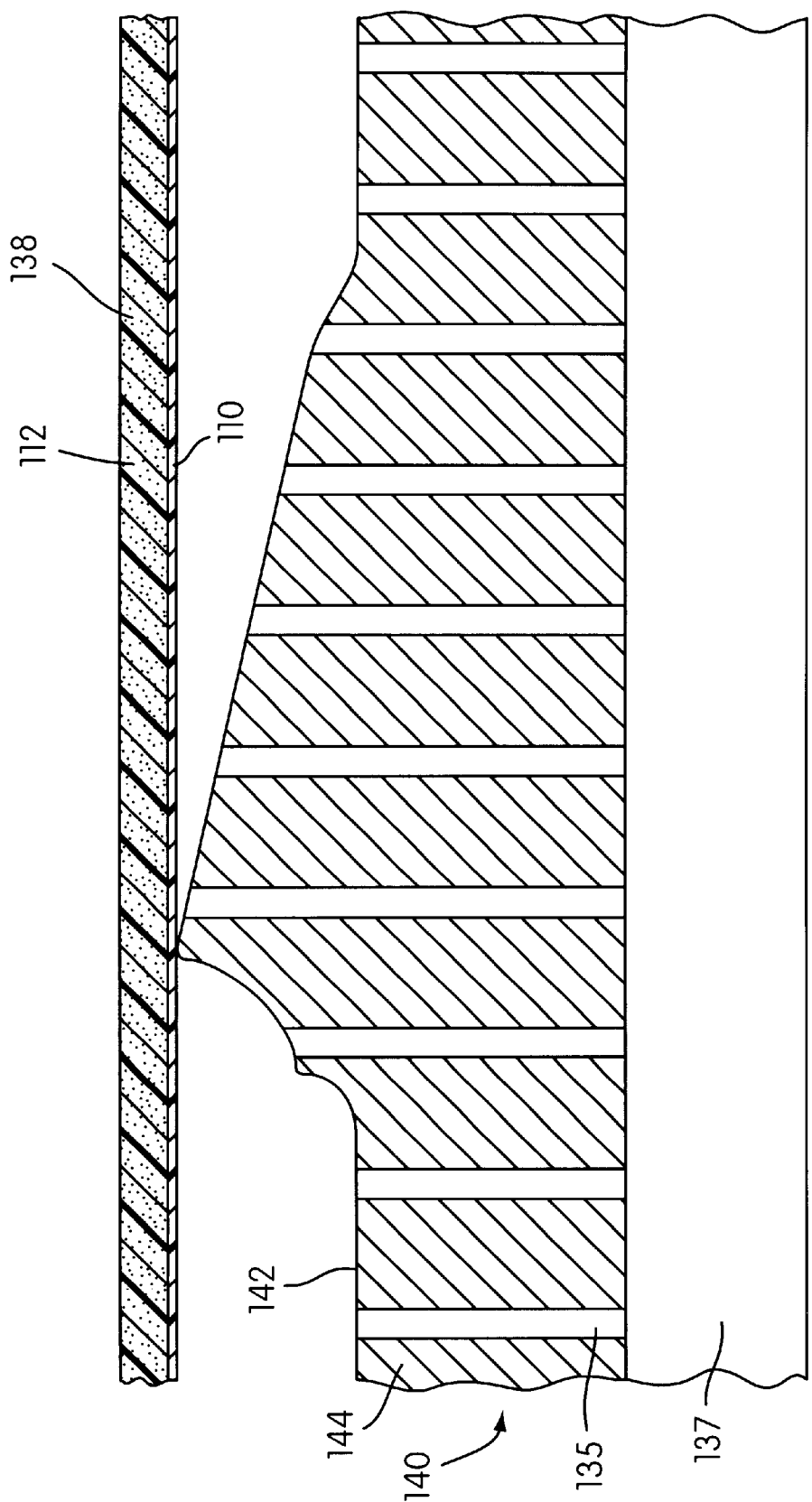
FIG. 10 is a schematic representation showing a fragment of a panel blank disposed in a vacuum mold assembly before being formed by a vacuum forming step.
Figure 11:
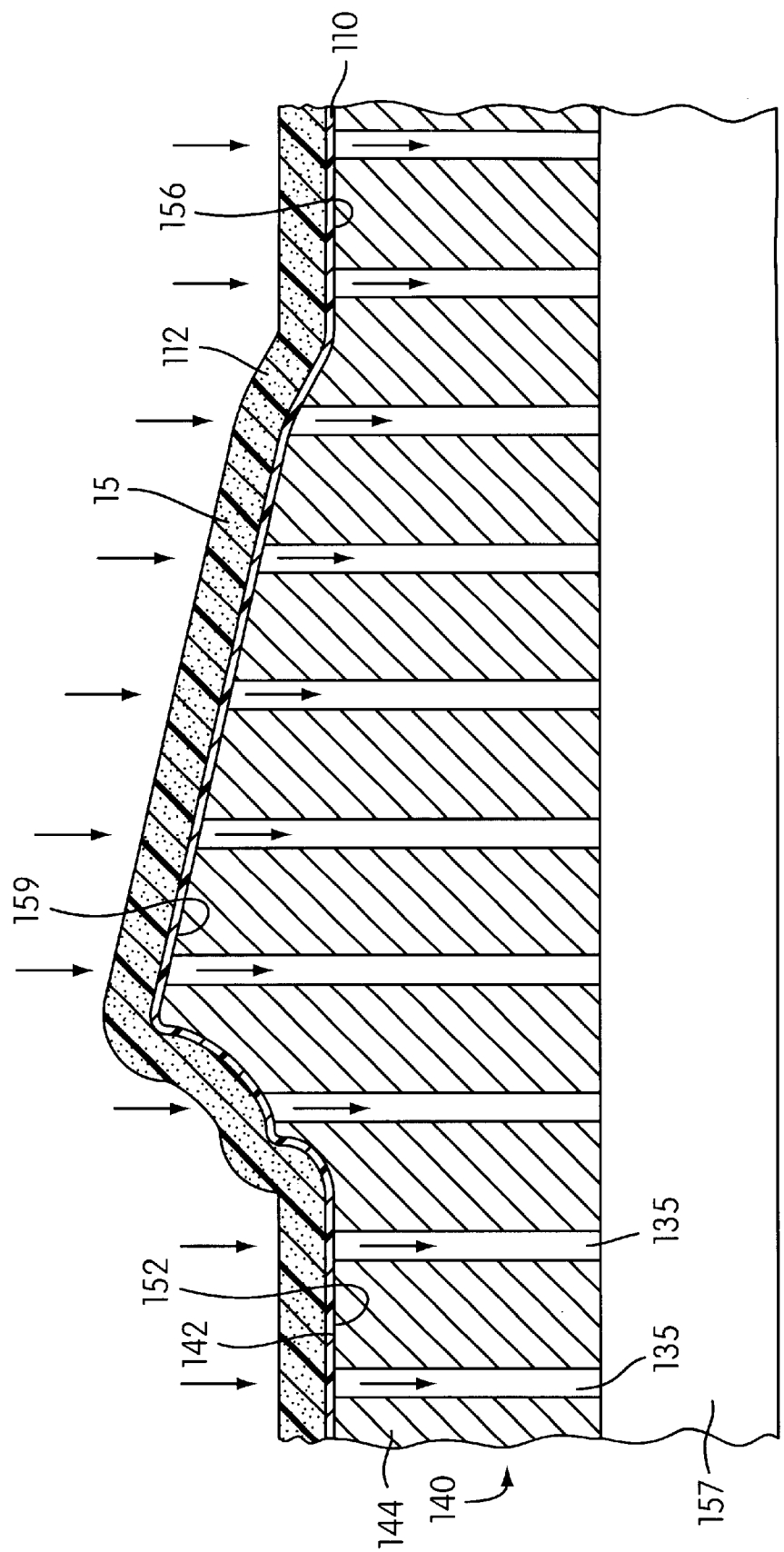
FIG. 11 is a view similar to FIG. 10 but showing the fragment of the panel blank after being formed by the vacuum forming step.

FIGS. 10–11 illustrate the vacuum molding process. FIG. 10 shows a fragmentary view of a panel blank 138 disposed in a vacuum mold assembly 140 (shown schematically). The blank 138 is placed in the mold assembly 140 and then a sufficient area of the intimately bonded laminated sheet 138 is heated to cover the surface 142 of a vacuum forming die 144 of the assembly 140. The die surface 142 defines a three dimensional exterior configuration of one surface of a door.

Figure 12:
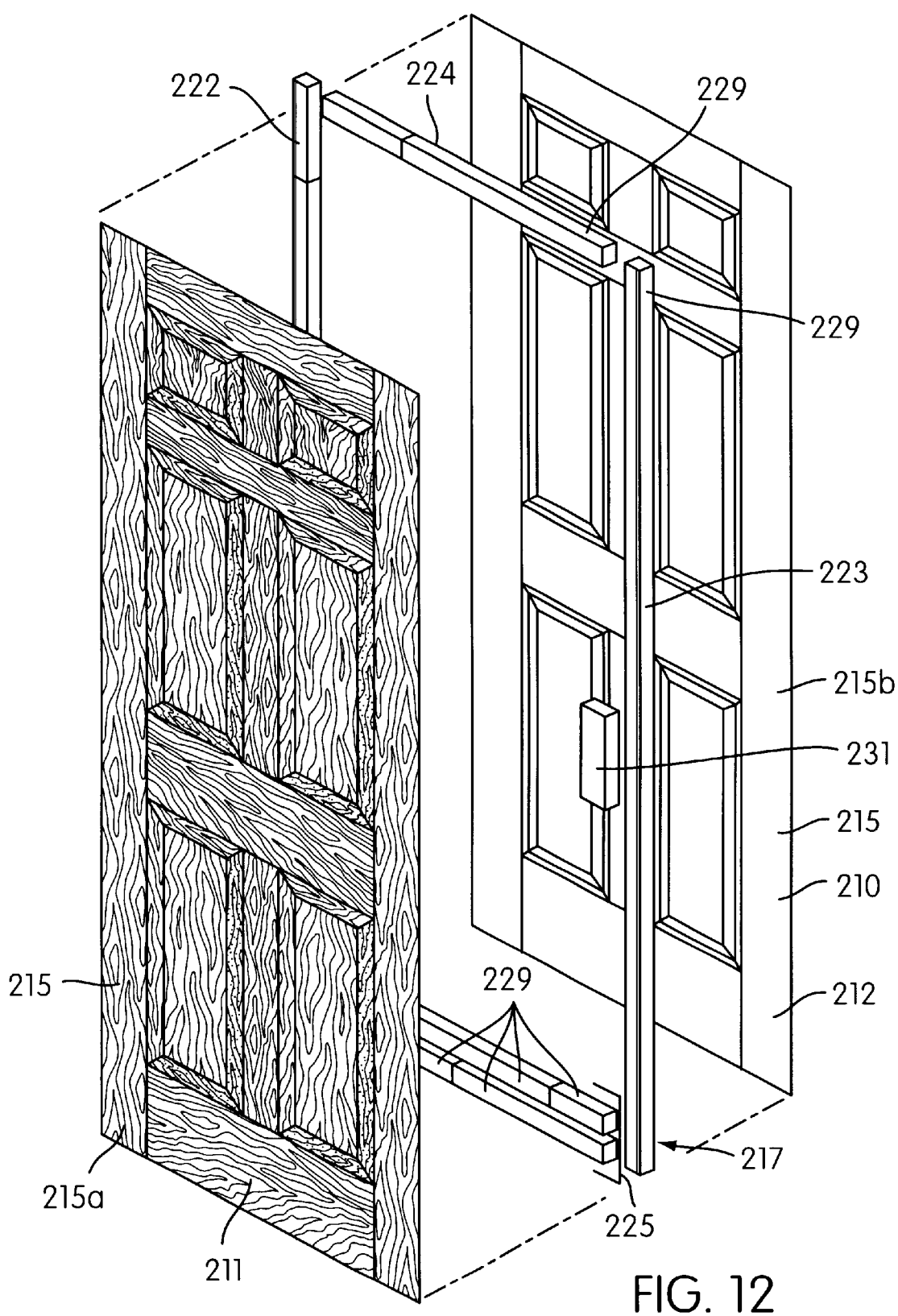
FIG. 12 is an exploded view of a two sided interior door constructed according to the principals of the present invention.

When a polystyrene blank sheet 138 having a total thickness and layer thicknesses as specified above is placed in the assembly 140, the portions of the sheet 138 to be formed by vacuum molding are heated to between 300 degrees Fahrenheit and 350 degrees Fahrenheit. The heated portions of the polystyrene sheet are thereafter subjected to a vacuum of between 14 to 15 psi pressure (through air passages 135, 137) which brings in the outer skin 110 of the panel into engagement and conformity with the die surface 142 as shown in FIG. 12.

The laminated material thus forms a thin relatively rigid door panel 15 when cooled. It can be appreciated from FIG. 3 that the vacuum molding process can provide the outer skin 110 of the door panel 15 with a raised six panel configuration. More specifically, it can be appreciated from FIG. 2 that the three dimensional door surface 34 of the panel 15 includes board-like vertical side surfaces 152, 153 with board-like upper and lower cross surfaces 154, 155 and a plurality of raised panel surfaces 156, 158 defined by recessed peripheral surfaces 159 within the board-like surfaces 152, 153, 154, 155. The three dimensional door surface further includes two vertically spaced board-like cross surfaces 160, 161 extending between the side surfaces 152, 153, there being two panels 156 or 158 immediately above and immediately below each of the intermediate cross surfaces 160.

It can also be appreciated from FIG. 2 that each of the board-like surfaces 152, 153, 154, 155, 160, 161 and the panel surfaces 156, 158, 159 have a wood grain texture. (The wood grain is not shown in FIG. 1 to more clearly illustrate the invention.) The wood grain texture is formed by relief structures that are etched on the surface 142 of the die assembly 140 but which relief structures are not shown in FIGS. 10–11 to more clearly illustrate the vacuum forming process. The panel 15 also includes relief lines 150 that simulate the abutting edges of wooden boards (also formed from relief features on the die surface 142 not shown in FIGS. 10–11).

It can be appreciated from FIG. 2 that after vacuum forming, the panel 15 closely resembles a traditional six panel door constructed of wooden boards. It can thus be appreciated that it is within the scope of the invention to provide the outer skin 110 with pigmentation that resembles the natural or finished (as with stain and/or varnish, etc.) color of a particular type of wood. For example, pigmentation can be added to provide a natural or finished Oak color, a natural or finished pine color and so on. The die assembly 140 can be constructed to provide a grain pattern of a corresponding type of wood. The outer skin can alternatively be pigmented to resemble a painted wood such as a white painted wood as described above. When the outer layer is provided with a pigment to simulate a painted wood finish, the outer layer may be provided with a smooth non-textured surface or, alternatively, may be provided with a wood grain texture from etching on the vacuum mold assembly to simulate a painted wood with wood grain visible through the paint.

It is also contemplated to further enhance the appearance of the panel 15, particularly a panel having a natural wood color, by adding additional coloration thereto through a silk screening process or, alternatively, through a photo printing process. Preferably the board-like surfaces and panel surfaces are silk screen or photo printed to provide a wood grain contrast on the pigmented surface which simulates the dominant color of the wood grain and preferably the wood grain contrast registers with the wood grain texture. In other words, it is contemplated to silk screen or photo print the outer skin 110 in some embodiments of the door 12 such that the grain coloration provided in the silk screening step or steps is applied to coincide with a wood grain texture or relief pattern formed on the surface of the outer skin 110 during the vacuum molding process. It is understood, however, that the silk screening process or photo printing process is optional and that it is contemplated to provide a panel in which the pigmentation alone provides the entire color of the exterior appearance of the one side of the door.

After any additional coloration is provided on the door panel 15, the door panel is mounted within the frame 17 as described above to form the door 12 and the door 12 is then mounted in a doorway using the mounting assemblies 14, 16. Preferably, at least the visible surfaces of the mounted frame are colored to match or, alternatively, to complement the color of the outer layer of the panel. Thus, the frame can be provided with a solid color (to simulate, for example, a painted surface such as a painted wood surface) or a color pattern (to simulate, for example, a natural or finished wood with a wood grain to match the panel). Thus the mounted frame may match the appearance of the outer layer of the panel so that the door appears to be made of a single material or can be colored to complement the color of the outer layer of the panel.

It can be understood that the door assembly 10 is frequently sold to and shipped to the end user (i.e., the consumer) in a disassembled condition. This allows the door assembly 10 to be shipped and stored in inventory using minimal storage volume and allows the components of the door assembly 10 to be packaged in a way that precludes damage during shipment. It can also be appreciated that because the panel 15 is relatively light weight and because the frame 17 can be mounted on the door panel 15 with the use of hand tools, assembly of the door assembly 10 and mounting of the door 12 in a doorway is very easy for a consumer. The only tool that consumer needs to affix the mounting assemblies 14, 16 to the door frame and wall and to the floor, respectively, is a screwdriver, although a drill may be needed to provide a pilot hole for the fasteners. When the door 12 is mounted in a doorway, the hook shaped portion of each stile is shaped to provide convenient handle structure for opening and closing the sliding door.

It can thus be understood that the door assembly 10 provides a full-size sliding door that is low-cost and aesthetically pleasing. The panel 15 shown in FIG. 3, for example, is approximately 78 inches high and can be constructed to be approximately 30.5 inches in width or, alternatively, approximately 36.5 inches in width, for example, so that it can be mounted in a standard size doorway.

Figure 13:
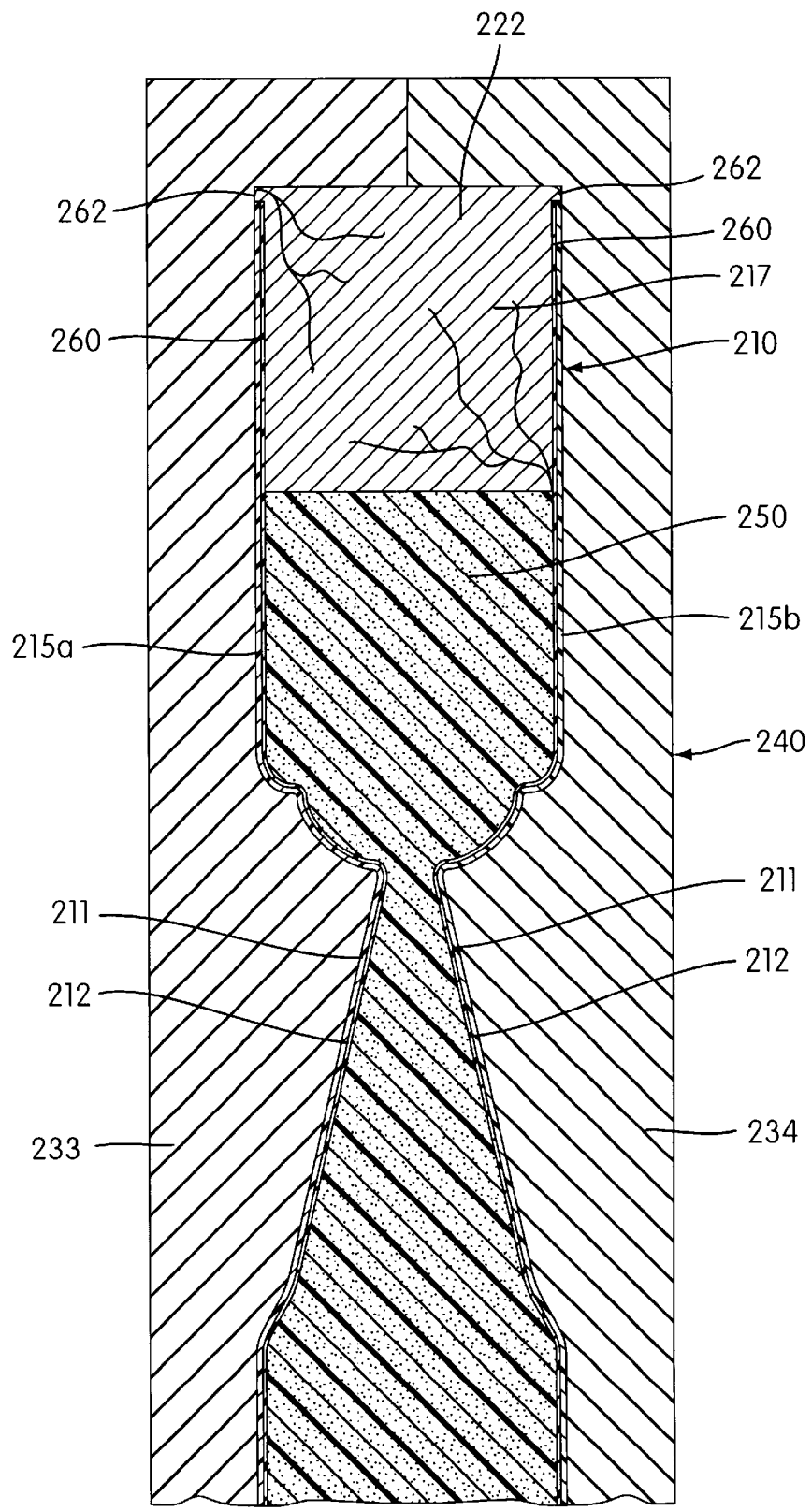
FIG. 13 shows an enlarged cross section of a fragment of the two sided interior door of FIG. 12 within a mold assembly used to construct the same.
Figure 14:
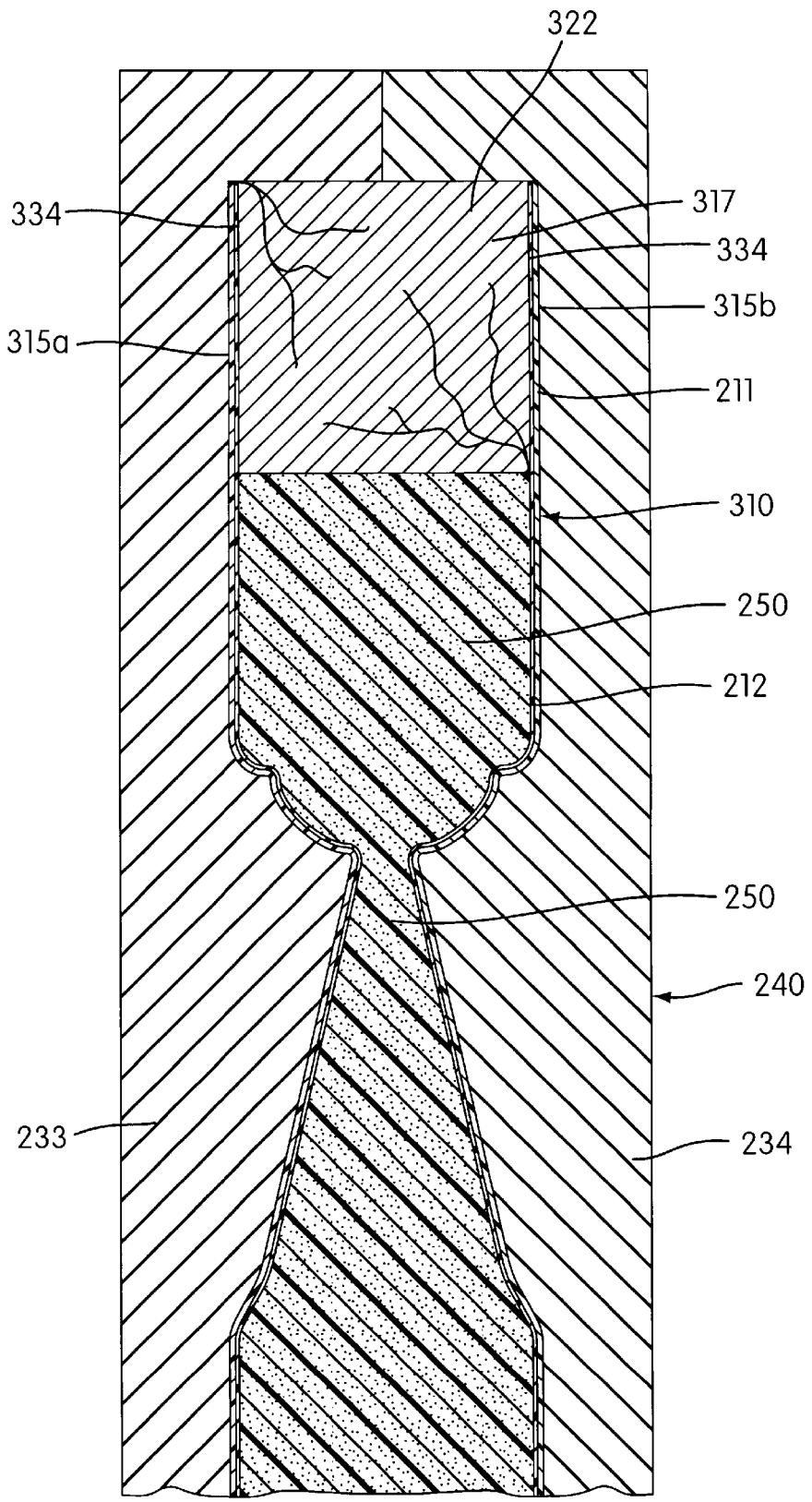
FIG. 14 is a view similar to FIG. 13 but showing another embodiment of the two sided interior door.

A second embodiment of a door 210 can be understood from an examination of in FIGS. 12–14. The door 210 includes two identical laminated panels 215 (FIG. 12). Each panel includes an outer skin 211 of thermoplastic material impregnated with pigmentation and an inner substrate 212 of relatively rigid thermoplastic material intimately impregnated with a filler and bonded to the outer skin 211. The construction of each panel 215 and the method of making the same is similar to the construction of and method for panel 15. The thickness of the substrate layer 212 of the panel 215 is less than the thickness of the substrate layer 112 of the panel 15, however, and most preferably the total thickness of the panel 215 is approximately 0.030 inch. Preferably, the thickness of the outer skin 211 of the panel 215 is within the same range of thickness as that described above for outer skin 110 of the panel 15 (i.e., approximately 0.010 inch to approximately 0.020 inch) and preferably the thickness of the substrate 212 of the panel 215 is within the range of from approximately 0.010 inch to approximately 0.020 inch.

As shown in the exploded view of the PIG. 12, the door 210 includes a peripheral frame 217 that is preferably made of a plurality of variously sized blocks of wood or wood products. More particularly, the peripheral frame 217, including the wooden stile structures 222, 223 and upper and lower rail structures 224, 225, respectively, are preferably made of variously sized elongated finger-jointed wooden blocks, generally designated 229, that are made of pine or other appropriate wood. A lock block structure 231, preferably made of particle board or other appropriate wood material, is secured to the associated stile 223 of the frame by an adhesive or other appropriate means. The lock block structure 231 is provided as part of the frame 217 to facilitate the mounting of a door knob (not shown) on the assembled door 210. The stile 222 can be used to mount hinges (not shown) to the door 210.

To construct the door 210, the peripheral frame 217 is secured between marginal peripheral edges (designated 215a and 215b for reference) of the two respective panels 215 with the substrate sides 212 facing toward each other so that the panels 215 are disposed in spaced relation. The frame 217 is secured to the panel edges 215a, 215b using an appropriate adhesive or glue or using any other appropriate means known to one skilled of the art. The panels 215 and the frame 217 secured therebetween are placed between mold halves 233, 234 of a mold assembly 240, a fragment of which is shown in cross-section in FIG. 14. The mold is sealed and a mineral filled foam core material is injected through a small opening in the frame 217 (not shown) into the space between the substrate 212 of each panel 215 defined by the peripheral frame 217. The hole in the frame to accommodate the injection is self-closing with the foam material or alternatively can be plugged or filled by any means known to one skilled in the art. Preferably, the foam material is a mineral filled polyurethane. The foam material expands and solidifies in a well-known manner to form a foam plastic core 250 between the panels 215 and within the frame 217. The mineral filler rigidifies and improves the weight of the door.

FIGS. 13 and 14 show two different embodiments of the door assembly, 210 and 310, that are identical except for the construction of the edge between each panel 215a, 215b and the frame 217 and 317, respectively. Structures between the two embodiments 210, 310 that are identical are given identical reference numbers and are not discussed further. It can be appreciated from FIG. 13 that side portions 260 of the stile 222 of the door 217 have been shaped to receive each panel 215 so that a portion 262 of the frame 217 extends beyond at least one of the peripheral edges of each panel 215 and that the portion 262 is flush with the top surface 34 of the respective panel. It can be understood that this construction can provide a peripheral wood structure on the door that extends the length of at least one edge of each panel so that the sides and/or top and/or bottom of the door to be easily planed or sanded or otherwise modified without interference from the plastic panels 215.

The embodiment 310 in FIG. 14 is identical to the embodiment 210 in FIG. 13 except the edges of the panels 315 completely cover the sides of the stile 322 of the frame 317 so that outwardly facing surfaces 334 on the door 310 will be completely covered with the panels 315.

It can be understood that because the panel 215 is identical to panel 15 except for the width and thickness of the substrate 212, the outside surface of the panel 215 provided by this skin layer 211 can be vacuum formed in a vacuum mold in a manner similar to that described above so that the panel 215 may be formed to include any of the relief features discussed above including the presentation of grain texture, board-like structures and raised panel appearance. Furthermore it is understood that the skin layer 211 can be impregnated with pigment and/or silk screened or photo printed as described above to enhance the appearance thereof to resemble a selected type of natural, finished or painted wood with or without a grain texture to provide a door that resembles a wooden door on two sides.

It can be appreciated that the substrate layer 212 can be made thinner than the substrate layer 112 of the panel 15 because the substrate layer 212 of the panel 215 is mounted on the frame 217 and on the foam core of material 250 which both 217, 250 help support the panel 215. The substrate layer 212 provides a support structure the allows the pigmented outer skin to be easily handled during manufacturing.

Thus, it can be understood that each door 10, 210, 310 provides a durable, economical and aesthetically pleasing door that does not need to be finished and the periodically refinished as a wood door requires and that resists warping under conditions that would warp a wooden door. It is within the scope of the invention to use a single two layer laminated panel to construct a sliding-type door or a sectioned folding-type door or to use two panels to construct a two-sided door.

It will thus be seen that the objects of the present invention have been fully and effectively accomplished. It will be realized, however, that the foregoing specific embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A door comprising
   a laminated panel formed of extruded sheet material;
   a peripheral frame along a peripheral edge of said laminated panel;
   said laminated panel comprising an outer skin of thermoplastic material impregnated with opaque pigmentation and an inner substrate intimately bonded with said outer skin, said inner substrate being formed of a relatively rigid thermoplastic material impregnated with a filler intimately bonded with said outer skin,
   said laminated panel being formed so that said inner substrate defines a surface which faces interiorly in use and said outer skin defines a three dimensional door surface which presents the texture and at least a part of the color of the exterior appearance of the door in use.

2. A door as defined in claim 1 wherein the thermoplastic material is UV stabilized.

3. A door as defined in claim 2 wherein the three dimensional door surface includes board-like vertical side surfaces with board-like upper and lower cross surfaces and a plurality of raised panel surfaces defined by recessed peripheral surfaces within said board-like surfaces.

4. A door as defined in claim 3 wherein said three dimensional door surface further includes two vertical spaced board-like cross surfaces extending between said side surfaces, there being two panels above and below each of said intermediate cross surfaces.

5. A door as defined in claim 4 wherein said board-like surfaces and said panel surfaces have a wood grain texture.

6. A door as defined in claim 5 wherein said board-like surfaces and panel surfaces are silk screen printed or photo printed to provide a wood grain contrast with the pigmentation which simulates the dominant color of the wood grain.

7. A door as defined in claim 6 wherein said wood grain contrast registers with the wood grain texture.

8. A door as defined in claim 2 wherein said pigmentation is the entire color of the exterior appearance of said one side of said door.

9. A door as defined in claim 1 wherein said peripheral frame is formed of metal trim.

10. A door as defined in claim 9 wherein said metal trim is color matched to the color of said outer skin.

11. A door as defined in claim 1 wherein said door includes a second laminated panel comprising a second outer skin of thermoplastic material impregnated with pigmentation and a second inner substrate of relatively rigid thermoplastic material impregnated with a filler and being intimately bonded to said outer skin, said peripheral frame being fixed between the marginal peripheries of said first mentioned and said second laminated panels maintaining them in spaced relation and a foamed plastic impregnated with a filler filling the space between said panels.

12. A door as defined in claim 1 wherein said outer skin comprises polystyrene impregnated with said pigmentation and said substrate comprises polystyrene impregnated with a mineral filler.

13. A door as defined in claim 1 wherein said filler is calcium hydroxide.

14. A method of making a door panel comprising
   coextruding an outer skin of plastic material defining an opaque color and an inner substrate of normally rigid plastic material capable of being rendered into a soft pliable condition by the application of heat to obtain an intimately bonded laminated sheet,
   heating a sufficient area of the intimately bonded laminated sheet to cover the surface of a vacuum forming die having a die surface defining a three dimensional exterior configuration of one surface of a door, and
   vacuum forming the laminate at a temperature rendering said substrate pliable with said outer skin in engagement with said die surfaces to form a relatively rigid door panel when cooled in which said substrate defines a surface which faces interiorly in use and said outer skin defines a three dimensional surface which presents the texture and at least a part of the color of the exterior appearance of the door in use.

15. A method of forming a door utilizing a door panel made by the method of claim 14 which comprises applying in metal trim frame to the periphery of said door panel.

16. A method of forming a door utilizing two door panels made by the method of claim 14 which comprises fixing a peripheral frame between marginal peripheral edges of the two panels with the substrates thereof disposed in spaced facing relation and expanding a foam plastic core impregnated with a filler within the space between the substrate of each panel defined by the peripheral frame.

17. A method as defined in claim 14 wherein said vacuum forming step forms board-like side surfaces and top and bottom board-like cross surfaces between said side surfaces and a plurality of raised panel surfaces defined by recessed peripheral surfaces within said board-like surfaces.

18. A method as defined in claim 17 wherein said vacuum forming step further forms two vertically spaced intermediate board-like surfaces extending between said side surfaces, there being two panels surfaces immediately above and below each of said intermediate cross surfaces.

19. A method as defined in claim 18 wherein said vacuum forming step forms a wood grain texture in said board-like surfaces and said panel surfaces.

20. A method and as defined in claim 19 further including the step of silk screening or photo printing the three dimensional surface with a contrasting wood grain color over the pigmentation which is of the dominant color.

21. A method as defined in claim 20 wherein the contrasting wood grain color is in registry with the wood grain texture.

22. A method as defined in claim 14 further including the step of silk screening or photo printing the three dimensional surface with a contrasting wood grain color over the pigmentation which is of the dominant color.

23. A method as defined in claim 14 wherein the thermoplastic material of the outer skin is polystyrene.

24. The method as defined in claim 14 wherein the thermoplastic material of said substrate is polystyrene with a filler imbedded therein.

25. The method as defined in claim 14 wherein the filler is calcium hydroxide in an amount within a range of approximately 20 percent to approximately 40 percent by volume.

26. The method as defined in claim 14 wherein the filler is calcium hydroxide in an amount of approximately 35 percent by volume.

27. The method as defined in claim 14 wherein said plastic material is polystyrene and wherein the vacuum forming step is carried out at a temperature of between 300 degrees Fahrenheit and 350 degrees Fahrenheit and at a pressure of the from 14 to 15 pounds per square inch of pressure.

28. A door as defined in claim 1, wherein the thermoplastic material of said outer skin is virgin polystyrene and the thermoplastic material of said inner substrate is reground polystyrene.

29. A method as defined in claim 14, wherein the thermoplastic material of said outer skin is virgin polystyrene and the thermoplastic material of said inner substrate is re-ground polystyrene.

\* \* \* \* \*